United States Patent [19]

Guidoux

[11] Patent Number: 4,549,049

[45] Date of Patent: Oct. 22, 1985

[54] ARRANGEMENT FOR TESTING A DEVICE PROVIDED WITH AN ECHO CANCELLER

[75] Inventor: Loïc B. Y. Guidoux, Plessis Robinson, France

[73] Assignee: Telecommunications Radioelectriques et Telephoniques, Paris, France

[21] Appl. No.: 514,540

[22] Filed: Jul. 18, 1983

Related U.S. Application Data

[63] Continuation of Ser. No. 368,781, Apr. 15, 1982, abandoned, which is a continuation of Ser. No. 117,188, Jan. 31, 1980, abandoned.

[30] Foreign Application Priority Data

Feb. 5, 1979 [FR] France ................. 79 02903

[51] Int. Cl.⁴ ................. H04M 1/24; H04B 17/00; H04B 3/46
[52] U.S. Cl. ................. 179/175.31 E; 179/170.2; 375/10
[58] Field of Search ............ 179/170.2, 170.6, 170.8, 179/170.4, 175.31 E; 375/10

[56] References Cited

U.S. PATENT DOCUMENTS

| | | | |
|---|---|---|---|
| 3,647,993 | 3/1972 | Foulkes et al. | 179/170.2 |
| 3,721,958 | 3/1973 | Dixon | 375/10 |
| 3,783,194 | 1/1974 | Vilips et al. | 179/170.2 |
| 4,162,378 | 7/1979 | Baudoux et al. | 179/170.2 |

Primary Examiner—Gene Z. Rubinson
Assistant Examiner—Randall P. Myers
Attorney, Agent, or Firm—Thomas A. Briody; William J. Streeter

[57] ABSTRACT

The test arrangement is intended to test, for example, a modem whose transmitter and receiver are coupled to the transmission line by means of a hybrid junction and comprises an echo canceller. The test consists of comparing a test signal applied to the transmitter with the signal restituted by the receiver when the modem is fedback from the line side. The test arrangement comprises an adder one input of which receives the error signal coming from the echo canceller, the other input receiving, during the test the feedback signal, its output being connected to the receiver. Means have been provided to make the signal restituted by the receiver different from the test sequence, when the error signal of the echo canceller exceeds a threshold.

11 Claims, 3 Drawing Figures

ARRANGEMENT FOR TESTING A DEVICE PROVIDED WITH AN ECHO CANCELLER

This is a continuation of application Ser. No. 368,781, filed Apr. 15, 1982, which is a continuation of application Ser. No. 117,188, filed Jan. 31, 1980, both abandoned.

BACKGROUND OF THE INVENTION

The invention relates to an arrangement for facilitating the testing of a device comprising a transmitting circuit and a receiving circuit coupled with a transmission line by means of a hybrid junction, the device comprising an echo canceller provided with a difference circuit which has one input connected to the receiving end of the hybrid junction, the other input to an echo copy signal generator and, finally, the output to the said receiving circuit, said test consisting of comparing the signal restituted by the receiving circuit and the signal applied to the transmitting circuit when the device to be tested is fed back at the transmission line side.

The device is to be tested may be, for example, a data transmission modem whose emitting circuit is an emitter modulating a carrier as a function of the data to be transmitted over the transmission line and whose receiving circuit is a receiver restituting the data received from the transmission line. The echo canceller incorporated in this modem has for its object to prevent any signal coming from the transmitter and appearing at the receiving end of the hybrid junction (owing to faulty operation of this junction or to echoes on the transmission line) from reaching the input of the receiver. Such a signal, which is denoted echo signal is cancelled at the output of the difference circuit of the echo canceller.

For testing a modem it is customary to effect the feedback from the transmission line side, the feedback consisting in that in one way or another a feedback signal, which corresponds to the signal produced by the transmitter, is made to appear at the receiving and of the hybrid junction. Testing a modem which is fedback in this manner and to whose transmitter a test sequence is applied must consist of a verification whether the signal restituted by the receiver is identical or not identical to this test sequence. When such a test system is used for a modem comprising an echo canceller, the following problem is met. The feedback signal appearing at the receiving end of the hybrid junction during the transmission of the test sequence is processed by the echo canceller as an echo signal and is consequently cancelled at the output of a difference circuit. Therefore, during the test, a proper operation of the echo canceller results, in practice, in an absence of the signal at the input of the receiver, having for its result that the signal restituted by the receiver is indeterminate and, at any rate, different from the test sequence applied to the transmitter. A test which is thus effected does not furnish any indication on the fact whether the modem functions properly or poorly. If then a further test operation is performed in which the echo canceller is disconnected, it is possible to get information on the quality of operation of the transmitter and receiver of the modem. But even after two tests of the modem, with and without echo canceller, there is not any indication on the operation of the echo canceller in the modem.

SUMMARY OF THE INVENTION

The present invention has for its object to obviate these drawbacks and to furnish a simple and fool-proof test arrangement for a device, such as a modem, provided with an echo canceller.

According to the invention, this test arrangement comprises an adder circuit, a first input of which is connected to the output of the difference circuit, the output is connected to the receiving circuit and the second input is connected to the receiving or the transmitting end of the hybrid junction by means of an interrupter circuit which is closed during a test, means having been provided to render the signal restituted by the receiving circuit different from the test signal applied to the transmitting circuit when the signal produced by the difference circuit exceeds a threshold having a limit value for the proper operation of the echo canceller.

DESCRIPTION OF THE DRAWINGS

The following description, given by way of nonlimitative example with reference to the accompanying drawings will show how the invention may be carried into effect.

DESCRIPTION OF THE PREFERRED EMBODIMENT

Figure 1:
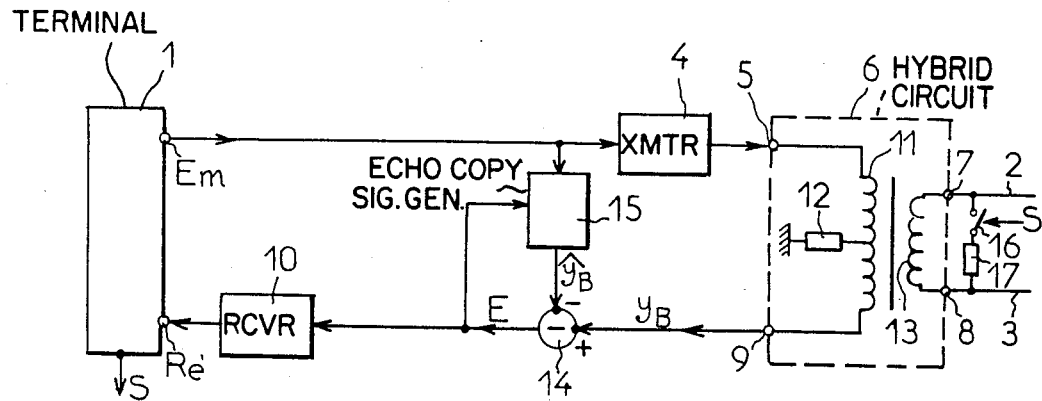
FIG. 1 shows the block diagram of a modem provided with an echo canceller.

FIG. 1 shows the block diagram of a modem one side of which is connected to a terminal 1 and the other side to two wires 2 and 3 of a transmission line. The data to be transmitted, which appear on the transmission terminal Em of terminal 1 are applied to the emitter 4 of the modem, which is, essentially, a modulator when the data are transmitted by modulation of a carrier. This transmitter may alternatively be a simple encoder when the data are transmitted in baseband. The output of the emitter 4 is connected to the receiving end 5 of the hybrid junction 6. The terminals 7 and 8 of the two-wire port of this junction are connected to the wires 2 and 3 of the transmission line. The receiving end 9 of the hybrid junction must be connected to the receiver 10 of the modem, whose output is connected to the receiving terminal Re of the terminal 1.

The hybrid junction 6 has for its function to send the signals coming from the emitter 4 only to the transmission line 1, 3 and to send the signals coming from the other end (not shown) of this transmission line to the receiver 10. In the shown, conventional form, this hybrid junction is in the form of a differential transformer whose winding 11, which is connected to the terminals 5, 9, has a central tapping point which is connected to ground via a balancing resistor 12 and whose winding 13 is connected to the terminals 7 and 8. By means of a suitable choice of the ratio between the windings 11 and 13 and the balancing resistor 12, it is, in principle, possible to realize the hybrid junction function. In practice, however, this function is never realized perfectly. When the transmitter 4 transmits, a parasitic signal, denoted echo signal, is found at the receiving end 9 of the hybrid junction, which echo signal, which may be caused by faults in the hybrid junction and/or to impedance discontinuities in the transmission line, may reach the receiver 10.

A conventional manner of cancelling this echo signal is the use of an echo canceller comprising a difference circuit 14 whose (+) input is connected to the receiving end 9 of the hybrid junction, whose (−) input is connected to the output of an echo copy signal generator 15 and whose output is connected to the input of the receiver 10. The generator 15 generates an echo copy signal from the data signal applied to the emitter 4; it is, fundamentally, a digital filtering device whose variable coefficients are controlled by the difference signal E produced by the difference circuit 14, in which the rms value is reduced. An echo canceller of this type is described in, for example, the published French Patent Application, which was filed by Applicants on Jan. 17, 1977 under number 77 01 197 corresponding to U.S. Pat. No. 4,162,378. In a further known type of echo canceller, the generator 15 generates the echo copy signal from the output signal of the transmitter 4 of the modem. In any case, when no signal is transmitted to the modem from the other end of the transmission line the difference signal E, which will be denoted the error signal hereinafter, is substantially zero after the period of time required for the convergence of the echo canceller.

To test a modem, for example from terminal 1, it is customary to effect a feedback of the modem from the transmission line side, to generate a test sequence on the transmission terminal Em of terminal 1 and to compare the signal obtained on the receiving terminal Re of the terminal with this test sequence. The modem can be fedback by disconnecting the transmission line and by connecting a matched impedance 17 between the two terminals 7 and 8 of the hybrid junction 6, by means of an interruptor 16, which can be closed by a feedback control signal S supplied by the terminal 1 at the instant the test is performed. In response to the test sequence which appears at the terminal Em of the terminal 1, it is possible to obtain a feedback signal $y_B$ which has a sufficient level to enable its processing in the receiver 10 directly at the receiving end 9 of the hybrid junction 6, as the result of its imperfections. If this is not the case, it is furthermore possible, to effect the test, to unbalance the junction by acting on the balancing impedance 12 or the impedance 17.

It is clear that it is possible to know with absolute certainty whether a modem, which does not comprise an echo canceller, operates satisfactorily or not by simply verifying in the terminal whether the signal received at the terminal Re is identical or not identical to the test sequence generated on the terminal Em. In the modem shown in FIG. 1, on the contrary, there is produced in response to the test sequence generated at the terminal Em of the terminal 1, the feedback signal $y_B$ at the receiving terminal 9 of the hybrid junction and also the echo copy signal $\hat{y}_B$ at the output of the generator 15 of the echo canceller. The difference between these two signals, $E=y_B-\hat{y}_B$, which, in practice, is cancelled out after the period of time required for the convergence of the echo canceller, is obtained at the output of the difference circuit 14. Finally, in response to a test sequence generated on the transmission terminal Em of the terminal 1, there is in practice, when the echo canceller operates properly, no signal at the input of the receiver of the modem, and consequently an indeterminate signal on the receiving terminal Re of the terminal. Therefore, this test does not allow normal operation of the receiver 10 of the modem and does not give any indication at the terminal 1 about whether the modem operates satisfactorily or not.

The present invention furnishes a different test arrangement by means of which these drawbacks can be obviated.

Figure 2:
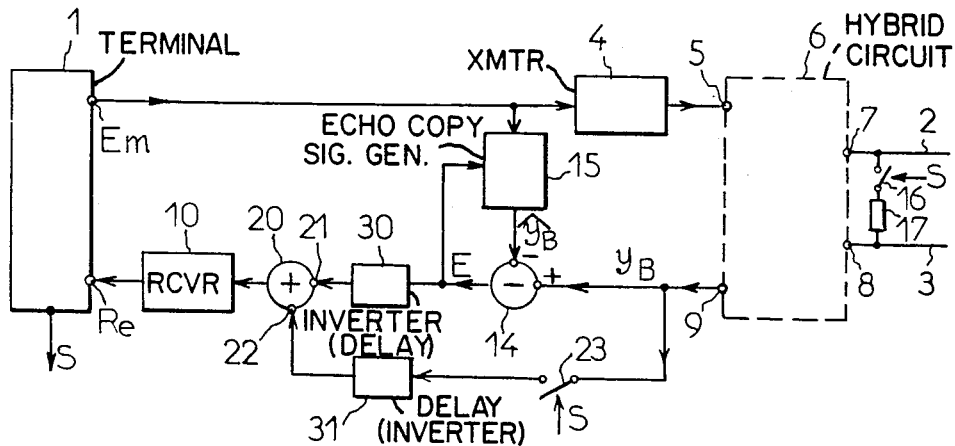
FIG. 2 shows a variation of the test arrangement according to the invention.

FIG. 2 shows a variation of the test system according to the invention, used in a modem. This test arrangement comprises an adder circuit 20, whose output is connected to the input of the receiver 10, but in the present variation, a circuit 30 is provided between the output of the difference circuit 14 and the input 21 of the adder circuit 20 and/or a circuit 31 is provided in the feedback signal path between the interruptor circuit 23 and the input 22 of the adder circuit 20. The circuits 30 and 31 have different functions, in such a way that when the one or the other of these circuits receives a signal, the receiver 10 restitutes a corresponding signal, whereas when the error signal E produced by the difference circuit 14 passes during a test the threshold which corresponds to the limit value at which the echo canceller operates properly, the combined signal produced by the adder circuit 20 produces a signal which differs from the test sequence at the output of the receiver 10.

There now follows, by means of non-limitative example, a description of some embodiments of this second variation, for several functions of the circuits 30 and 31 and the presence of the one or the other of these circuits.

It is, for example, possible to use the circuit 30 and to omit the circuit 31. This circuit 30 may, for example, be a simple inverter circuit, which changes the sign of the signal at its input. Outside the test period, the interruptor 23 being open, the presence of the inverter circuit 30 does not disturb the operation of the modem as it is easy to take the sign change into consideration in the receiver 10. During the test period, the interrupter 23 being closed, the test sequence is found again at the output of the receiver 10 when the echo canceller operates properly. The error signal E at the output of the difference circuit is now substantially zero. Reference must be had to the abovementioned three types of faults which occur in practice, to explain what happens when the echo canceller operates incorrectly. When the signal E is indeterminate, it will be clear that the receiver 10 restitutes at the terminal Re of the terminal 1 a signal which differs from the transmitted test sequence. When the error signal E is, for example, $E \simeq y_B$, thanks to the sign change effected by the inverter circuit 30, the signal $y_B-E$ produced by the adder circuit 20 is substantially zero, in response to which an indeterminate signal, consequently differing from the transmitted test sequence, is obtained at the output of the receiver 10. Finally, when the error signal E has the same shape as the feedback signal $y_B$ only important faults can be detected, which are expressed by a high value of E, in such a way that the signal $y_B-E$ produced by the adder circuit 20 is lower than the sensitivity limit of the receiver 10.

In the embodiment according to the invention described above, the function of the inverter circuit 30 may be performed by the difference circuit 14 by reversing the signals applied to its inputs (+) and (−), respectively, so that the signal −E, E being equal to $y_B-\hat{y}_B$, is directly obtained at the output of this circuit. The echo copy signal generator 15 can easily take the sign change of the error signal applied to it into consideration.

In accordance with a next embodiment according to the invention it is alternatively possible to use an inverter circuit 31 which changes the sign of the feedback signal $y_B$, omitting the circuit 30. During a test the signal E-$y_B$ is then obtained at the output of the adder circuit 20.

In accordance with a still further embodiment of the invention, the circuits 30 or 31 may be delay circuits in such a manner that, during a test, the combined signal at the output of the adder circuit 20 detects at the output of the receiver 10 a signal which differs from the transmitted test sequence.

It is, for example, possible to use a circuit 30 which produces a delay T/2, omitting circuit 31, T being the duration of each data bit supplied and received by the terminal 1. It will be obvious that a delay produced by the circuit 30 does not affect the operation of the modem outside the test period. During the test period, when the canceller operates properly (E≈0), it is possible to ascertain whether the modem operates properly. It will be clear that faulty operation of the echo canceller, in such a way that the signal E is indeterminate, can always be easily recognized. When the echo canceller operates incorrectly, so that the error signal E is equal to or near $y_B$ a signal in which, owing to the delay T/2 produced by the circuit 30, changes are produced in the center of the duration T of the transmitted test sequence bits, is obtained at the output of the adder circuit 20; in response thereto the receiver 10 produces any random signal differing from the transmitted test sequence, which is an indication that the modem operates incorrectly.

It is alternatively possible to use a delay circuit 31 which produces, for example, a delay T/2, omitting circuit 30. It is also possible to combine the two-above described embodiments. FIG. 2 showing this variation of the test arrangement according to the invention. The circuits 30 and 31 may, for example, be an inverter circuit and a delay circuit, respectively, and the other way round. The circuit 30 or the circuit 31 may alternatively be an inverter circuit followed by a delay circuit.

It is also possible to assign other functions which can be easily conceived by one skilled in the art than those described above by way of example, to the circuits 30 and 31. These functions must be such that outside the test period the operation of the modem is not disturbed and also such that during a test the combined signal produced by the adder circuit 20 in the event the echo canceller operates incorrectly produces a signal which differs from the test sequence at the output of the receiver 10.

Figure 3:
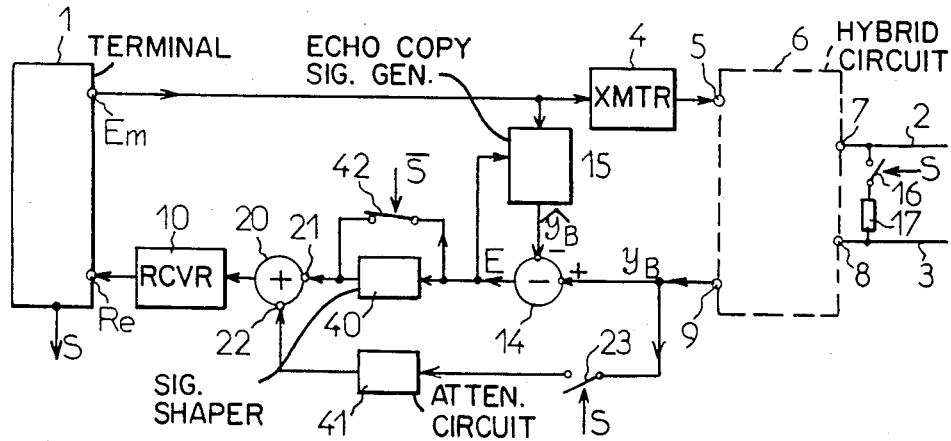
FIG. 3 shows a second variation of the test arrangement according to the invention.

A second variation of the test arrangement according to the invention, shown in FIG. 3 is also very sensitive to small faults in the operation of the echo canceller. The elements of FIG. 3 which are identical to those of the preceding Figures have been given the same reference numerals.

This test arrangement comprises a circuit 40 arranged between the output of the difference circuit 14 and the input 21 of the adder circuit 20 and, preferably, an attenuation circuit 41 arranged in the feedback signal path between the interrupter circuit 23 and the input 22 of the adder circuit 20. The circuit 40 has for its function to change the shape of the signal applied to its input in such a way that in response to the feedback signal $y_B$ it produces a different signal which cannot be recognized by the receiver 10 as corresponding to the transmitted test sequence. The circuit 40 may be, for example, a filter. An interrupter circuit 42, which is controlled by the signal $\overline{S}$ thus that it is closed outside the test period and open during the test period, is, finally, connected to the terminals of this circuit 40.

It is therefore clear that, outside the test period, the operation of the modem is not affected by the circuit 40, which is short-circuited by the closed interrupter circuit 42, and by the circuit 41, which is disconnected by the open interrupter circuit 23.

The circuits 40 and 41 are operative during the test period. When the echo canceller operates properly, the error signal E applied to the circuit 40 is substantially zero and this circuit 40 also produces a signal which is substantially zero. This results in that the receiver 10 restitutes a signal which is identical to the test sequence. When the echo canceller operates incorrectly, so that the error signal E is indeterminate, a signal which is different from the transmitted test sequence is always obtained at the output of the receiver 10. When the echo canceller operates incorrectly in such a way that the error signal E is equal to (or near) the feedback signal $y_B$, the circuit 40 produces a signal which differs from $y_B$ and the receiver 10 no longer recognizes the feedback signal $y_B$ in the combined signal it receives from the adder circuit 20. The receiver 10 then restitutes a signal which differs from the transmitted test sequence. Then, to detect small faults in the operation of the echo canceller, apparent from a value of the error signal E deviating from zero, but to a very low extent only, an attenuator circuit 41 can be used to advantage. The attenuation coefficient k of this circuit 41 can be chosen so that the signal $ky_B$ which, in practice, is the only signal applied to the receiver 10 when the echo canceller functions properly should be just above the sensitivity limit of the receiver 10, which then restitutes the transmitted test sequence. Then, a weak error signal E whose shape is changed by circuit 40 produces at the output of the adder circuit 20 a signal in which the receiver 10 cannot recognize the feedback signal corresponding to the transmitted test sequence. Thus, above a value of the error signal E, which may be as low as desired and which is controllable by the attenuation coefficient k, the receiver 10 supplies a signal which differs from the transmitted test sequence.

It is of course also possible to combine the variation of the test arrangement shown in FIG. 3 with the variation shown in FIG. 2.

The above description relates to the use of the test system according to the invention in a data transmission modem comprising an echo canceller. The same test problem is found in telephony each time a two wire-four wire coupler for coupling a two-way transmission line to a one-way transmission and receiving line is provided with an echo canceller to cancel the echoes produced on the transmission line. It will be clear that the arrangement according to the invention is perfectly suitable to test the proper operation of such a device.

What is claimed is:

1. In an arrangement for facilitating the testing of an apparatus of the type including a transmitting circuit and a receiving circuit coupled to a transmission line by means of a hybrid junction, the transmitter and receiver being adapted respectively to receive signals from and apply signals to a terminal, the apparatus further including an echo canceller provided with a difference circuit which has one input connected to the receiving end of the hybrid junction, another input connected to an echo copy signal generator and an output connected to said receiving circuit, the echo copy signal generator being connected to receive signals applied to said transmitting circuit, said test consisting of comparing the signal output by the receiving circuit and a test signal applied to the transmitting circuit when the apparatus to be tested is fedback from the transmission line end, the improvement wherein the arrangement comprises an adder circuit, means coupling a first input of the adder circuit to the output of the difference circuit, the adder circuit having an output coupled to the input of the receiving circuit, said coupling means further coupling a second input of the adder circuit to the receiving end of the hybrid junction by means of an interrupter circuit adapted to be closed only during a test, said coupling means comprising means for altering the signal to be output by the receiving circuit such that the output signal, when the test signal is applied to the transmission circuit, is different from the test signal applied to the transmission circuit and different from the output of the difference circuit.

2. In the testing arrangement of claim 1, the improvement, wherein said altering means comprises a switchable signal modifying circuit, having a control input, coupled in series with the first input of said adder circuit, this signal modifying circuit operating such that when the signal modifying circuit receives a signal the combined signal supplied by the adder circuit produces at the output of the receiving circuit a signal which differs from the test signal.

3. In the testing arrangement of claim 2, the improvement, wherein the switchable signal modifying circuit is a switchable inverter.

4. In the testing arrangement of claim 2, the improvement, wherein the switchable signal modifying circuit is a switchable delay device.

5. In the testing arrangement of claim 1, the improvement, wherein said altering means comprises a switchable signal shaping circuit having a control input coupled in series with the first input of the adder circuit for changing the shape of the signal applied to the input, and an interrupter circuit connected to the terminals of the signal shaping circuit and controlled so that it is closed outside the test period and open during this period.

6. In the testing arrangement of claim 5, the improvement, wherein said testing arrangement further comprises a switchable attenuator circuit, having a control input, which is arranged in series with the second input of the adder circuit.

7. In the testing arrangement of claim 1, the improvement, wherein said altering means comprises a switchable signal modifying circuit having a control input arranged in series with the second input of said adder circuit, this signal modifying circuit operating such that when the signal modifying circuit receives a signal, the combined signal supplied by the adder circuit produces at the output of the receiving circuit a signal which differs from the test signal.

8. In the testing arrangement of claim 7, the improvement, wherein said switchable signal modifying circuit is a switchable inverter.

9. In the testing arrangement of claim 7, the improvement, wherein said switchable signal modifying circuit is a switchable delay device.

10. In the testing arrangement of claim 1, the improvement, wherein said altering means comprises a first switchable signal modifying circuit having a control input arranged in series with the first input of said adder circuit, a second switchable signal modifying circuit, having a control input arranged in series with the second input of said adder circuit, said first signal modifying circuit performing an operation on the signal applied thereto different, respectively, from said second signal modifying circuit such that when either one of said signal modifying circuits receives a signal the combined signal supplied by the adder circuit produces at the output of the receiving circuit a signal which differs from the test signal.

11. In the testing arrangement of claim 10, the improvement, wherein one of said first and second switchable signal modifying circuits is a switchable inverter while the other of said first and second switchable signal modifying circuits is a switchable delay device.

* * * * *